US012741559B2

(12) United States Patent
Kobuna

(10) Patent No.: US 12,741,559 B2
(45) Date of Patent: Sep. 22, 2026

(54) VEHICLE, POWER ADJUSTMENT SYSTEM, AND POWER EQUIPMENT

(71) Applicant: TOYOTA JIDOSHA KABUSHIKI KAISHA, Toyota (JP)

(72) Inventor: Shunsuke Kobuna, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 702 days.

(21) Appl. No.: 18/326,083

(22) Filed: May 31, 2023

(65) Prior Publication Data

US 2024/0042886 A1 Feb. 8, 2024

(30) Foreign Application Priority Data

Aug. 3, 2022 (JP) ................................ 2022-124019

(51) Int. Cl.
*B60L 53/63* (2019.01)
*B60L 53/62* (2019.01)

(52) U.S. Cl.
CPC ............... *B60L 53/63* (2019.02); *B60L 53/62* (2019.02)

(58) Field of Classification Search
CPC .......... H02J 3/28; H02J 13/00; H02J 2105/52; H02J 2105/30; H02J 7/663; H02J 7/82; H02J 9/00; H02J 2103/35; H02J 2101/28; H02J 7/04; H02J 3/322; H02J 7/1438; B60L 53/126; B60L 53/124; B60L 53/63; B60L 55/00; B60L 53/65; B60L 53/64; B60L 53/665; B60L 53/52; B60L 53/38; B60L 53/12; B60L 53/68; B60L 53/18; B60L 53/22; B60L 53/39; B60L 53/24; B60L 53/34; B60L 53/53; B60L 53/66; B60L 53/67; B60L 53/122; B60L 53/36; B60L 53/11; B60L 53/305; B60L 53/302; B60L 53/62; B60L 53/57
USPC .................................................. 320/108–115
See application file for complete search history.

(56) References Cited

U.S. PATENT DOCUMENTS

2013/0217409 A1* 8/2013 Bridges ................ B60L 53/305 455/456.1
2016/0079757 A1* 3/2016 Matan ...................... G05F 1/66 307/24
2018/0205230 A1 7/2018 Kudo et al.
2020/0231057 A1 7/2020 Hishida et al.
2020/0274357 A1* 8/2020 Inoue ..................... H02J 3/381
(Continued)

FOREIGN PATENT DOCUMENTS

JP 2020-115706 A 7/2020
JP 2020-156149 A 9/2020
(Continued)

*Primary Examiner* — Binh C Tat
(74) *Attorney, Agent, or Firm* — Finnegan, Henderson, Farabow, Garrett, and Dunner, LLP

(57) ABSTRACT

A vehicle includes an inlet, a main battery, an auxiliary battery, and a communication device. The main battery is charged with electric power received by the inlet. The auxiliary battery is chargeable with electric power of the main battery. The communication device communicates with power equipment by using electric power of the auxiliary battery. The main battery is charged with minute electric power in a case where the vehicle does not participate in demand response and the SOC of the main battery is lower than a threshold value when the inlet is connected to the power equipment.

18 Claims, 7 Drawing Sheets

(56) References Cited

U.S. PATENT DOCUMENTS

| | | | |
|---|---|---|---|
| 2020/0298720 | A1 | 9/2020 | Ogawa |
| 2022/0072973 | A1 | 3/2022 | Tsuchiya |

FOREIGN PATENT DOCUMENTS

| | | | |
|---|---|---|---|
| JP | 2022-043801 | A | 3/2022 |
| KR | 10-2019-0037624 | A | 4/2019 |

* cited by examiner

1
SERVER
10
ARS (RE)
SERVER
20
PROCESSING DEVICE
26
STORAGE DEVICE
22
COMMUNICATION DEVICE
21
SG1, RV
50
34
30
40

40
30
36
CONTROL DEVICE
38
POWER CONVERSION DEVICE
COMMUNICATION UNIT
35
32
CC (CMV)
37
CONNECTOR
50
INLET
110
PISW
132
34
MAIN BATTERY
150
COMMUNICATION DEVICE
135
POWER CONVERSION DEVICE
180
ECU
182
CPU
184
MEMORY
186
DR PARTICIPATION/ NON-PARTICIPATION INFORMATION
137
AUXILIARY BATTERY

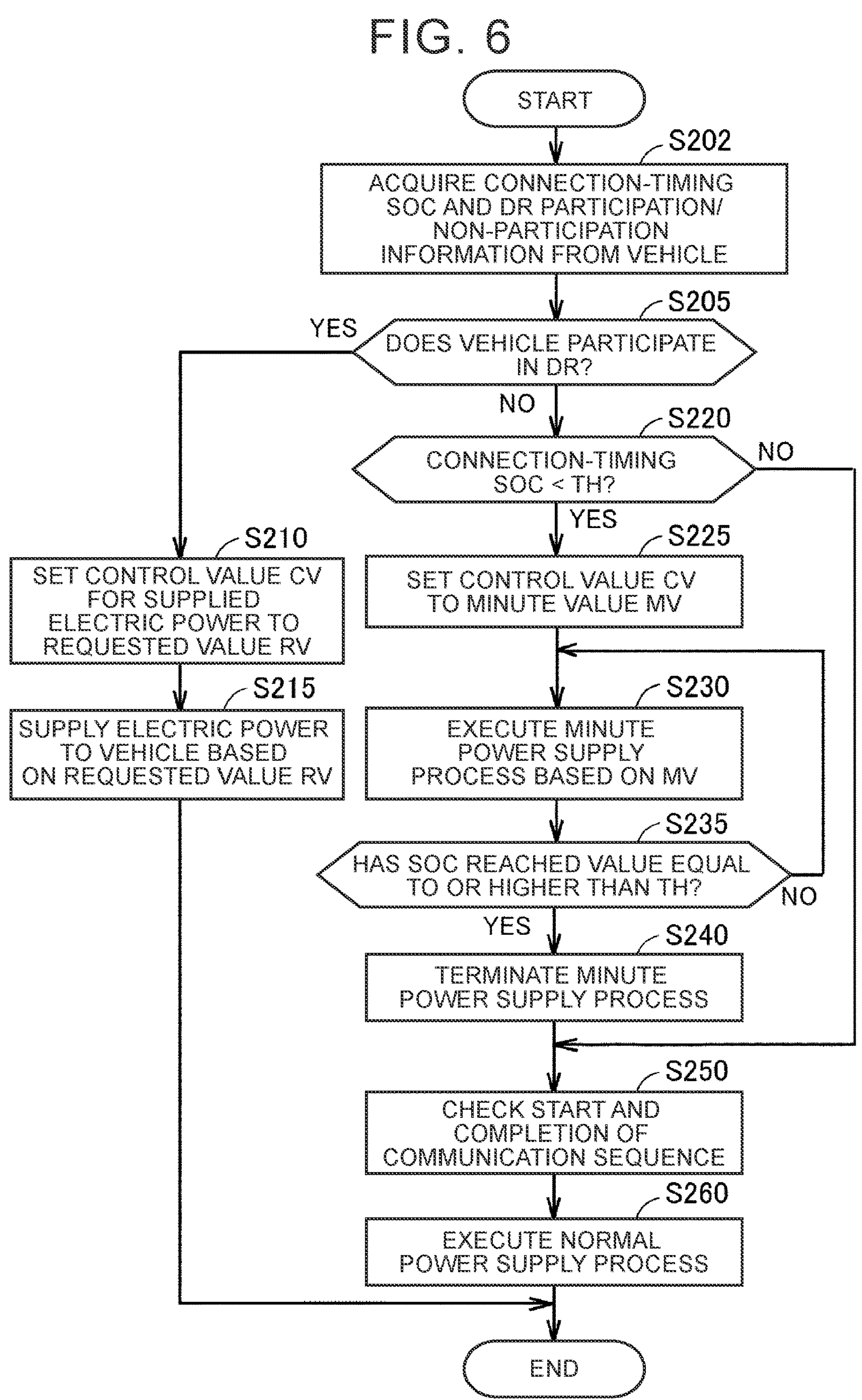
FIG. 6
START
S202
ACQUIRE CONNECTION-TIMING SOC AND DR PARTICIPATION/ NON-PARTICIPATION INFORMATION FROM VEHICLE
S205
DOES VEHICLE PARTICIPATE IN DR?
YES
NO
S220
CONNECTION-TIMING SOC < TH?
NO
YES
S210
SET CONTROL VALUE CV FOR SUPPLIED ELECTRIC POWER TO REQUESTED VALUE RV
S215
SUPPLY ELECTRIC POWER TO VEHICLE BASED ON REQUESTED VALUE RV
S225
SET CONTROL VALUE CV TO MINUTE VALUE MV
S230
EXECUTE MINUTE POWER SUPPLY PROCESS BASED ON MV
S235
HAS SOC REACHED VALUE EQUAL TO OR HIGHER THAN TH?
NO
YES
S240
TERMINATE MINUTE POWER SUPPLY PROCESS
S250
CHECK START AND COMPLETION OF COMMUNICATION SEQUENCE
S260
EXECUTE NORMAL POWER SUPPLY PROCESS
END

VEHICLE, POWER ADJUSTMENT SYSTEM, AND POWER EQUIPMENT

CROSS-REFERENCE TO RELATED APPLICATION

This application claims priority to Japanese Patent Application No. 2022-124019 filed on Aug. 3, 2022, incorporated herein by reference in its entirety.

BACKGROUND

1. Technical Field

The present disclosure relates to a vehicle, a power adjustment system, and power equipment.

2. Description of Related Art

Japanese Unexamined Patent Application Publication No. 2020-156149 (JP 2020-156149 A) discloses a power control system. The power control system controls a power supply and demand balance in a power grid through demand response (DR). The DR is a method for requesting a power adjustment resource of a consumer to vary (for example, increase) a power demand. The power adjustment resource includes a vehicle including a power storage device.

SUMMARY

The vehicle can receive electric power supplied from power equipment connected to the power grid. In general, the vehicle includes a communication device that communicates with the power equipment by using electric power from an auxiliary power storage device of the vehicle.

When the electric power of the auxiliary power storage device decreases but the state of charge (SOC) of a vehicle traveling power storage device is high, the auxiliary power storage device can be charged with electric power of this power storage device. When the SOC of the traveling power storage device is low, it may be difficult to charge the auxiliary power storage device from this power storage device. Therefore, when the electric power of the auxiliary power storage device is exhausted, the communication device cannot operate. As a result, the communication between the vehicle and the power equipment is interrupted, and various types of information cannot be exchanged between the vehicle and the power equipment.

When the vehicle participates in energy adjustment such as DR, the vehicle can contribute to the adjustment of the power supply and demand balance by receiving electric power from the power equipment. The vehicle can receive electric power from the power equipment also when the vehicle does not participate in the energy adjustment. In this case, the power supply from the power equipment to the vehicle (power reception by the vehicle) may influence the power supply and demand balance depending on the magnitude of the supplied electric power.

In the present disclosure, even when the vehicle receives electric power from the power equipment without participating in the energy adjustment, various types of information can securely be exchanged between the vehicle and the power equipment while substantially preventing the influence on the power supply and demand balance.

A vehicle of the present disclosure is configured to participate in energy adjustment for adjusting a power supply and demand balance in a power grid. The vehicle includes a power receiving device, a first power storage device, a second power storage device, and a communication device. The power receiving device is configured to receive electric power supplied from power equipment connected to the power grid when connected to the power equipment. The first power storage device is configured to be charged with the electric power received by the power receiving device. The second power storage device is connected to the first power storage device and configured to be charged with electric power of the first power storage device. The communication device is configured to communicate with the power equipment by using electric power of the second power storage device. The first power storage device is configured to be charged with minute electric power in a case where the vehicle does not participate in the energy adjustment and a state of charge of the first power storage device is lower than a threshold value when the power receiving device is connected to the power equipment. The minute electric power is smaller than the supplied electric power in a case where the vehicle participates in the energy adjustment.

According to the above configuration, the first power storage device is charged with the minute electric power supplied from the power equipment through the power receiving device. This substantially prevents the influence on the power supply and demand balance due to the power supply from the power equipment to the vehicle. After the charging of the first power storage device with the minute electric power continues and the state of charge of the first power storage device increases, the second power storage device can be charged with the electric power of the first power storage device. As a result, the communication device can securely communicate with the power equipment by using the electric power of the second power storage device.

In the above vehicle, the threshold value may be the state of charge at which the second power storage device is charged from the first power storage device for a power consumption required for operating the communication device.

The above vehicle may further include a control device configured to execute a charging control process for controlling charging of the first power storage device. The charging control process may include a first charging process for charging the first power storage device with the minute electric power, and a second charging process for charging the first power storage device after the first charging process with supplied electric power larger than the minute electric power. The communication device may be configured to complete a communication sequence with the power equipment to start the second charging process after the first charging process. The power consumption required for operating the communication device may be a power consumption required for completing the communication sequence by the communication device.

A power adjustment system of the present disclosure may include a first vehicle serving as the above vehicle, and a second vehicle different from the first vehicle and configured to receive electric power from the power grid. In a case where the second vehicle receives the electric power from the power grid, the received electric power of the second vehicle when the first power storage device is charged with the minute electric power may be smaller than the received electric power of the second vehicle when the first power storage device is not charged with the minute electric power.

A power adjustment system of the present disclosure may include a first vehicle serving as the above vehicle, and a third vehicle different from the first vehicle and configured to discharge electric power to the power grid. In a case where the third vehicle discharges the electric power to the power grid, the discharged electric power of the third vehicle when the first power storage device is charged with the minute electric power may be larger than the discharged electric power of the third vehicle when the first power storage device is not charged with the minute electric power.

Power equipment of the present disclosure may be configured to supply electric power to a vehicle. The vehicle may be configured to be connected to a power grid and to participate in energy adjustment for adjusting a power supply and demand balance in the power grid. The vehicle may include a power receiving device configured to receive electric power supplied from the power equipment when connected to the power equipment, a first power storage device configured to be charged with the electric power received by the power receiving device, a second power storage device connected to the first power storage device and configured to be charged with electric power of the first power storage device, and a communication device configured to communicate with the power equipment by using electric power of the second power storage device. The power equipment may include a power supply device configured to supply the electric power to the power receiving device when connected to the power receiving device, and a communication unit configured to acquire a state of charge of the first power storage device from the vehicle. The first power storage device may be configured to be charged with minute electric power in a case where the vehicle does not participate in the energy adjustment and the state of charge of the first power storage device is lower than a threshold value when the power receiving device is connected to the power equipment. The minute electric power may be smaller than the supplied electric power in a case where the vehicle participates in the energy adjustment.

In the above power equipment, the threshold value may be the state of charge at which the second power storage device is charged from the first power storage device for a power consumption required for operating the communication device.

The above power equipment may further include a power supply control device configured to execute a power supply control process for controlling power supply from the power supply device to the power receiving device. The power supply control process may include a first power supply process for supplying the minute electric power to the power receiving device, and a second power supply process for supplying electric power larger than the minute electric power to the power receiving device after the first power supply process. The communication device may be configured to complete a communication sequence with the power equipment to start the second power supply process after the first power supply process. The power consumption required for operating the communication device may be a power consumption required for completing the communication sequence by the communication device.

According to the present disclosure, even when the vehicle receives electric power from the power equipment without participating in the energy adjustment, various types of information can securely be exchanged between the vehicle and the power equipment while substantially preventing the influence on the power supply and demand balance. In the following, DR is used as an example of the energy adjustment.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flowchart showing an example of a process to be executed by a control device of the power equipment;

DETAILED DESCRIPTION OF EMBODIMENTS

Figures 1, 2:
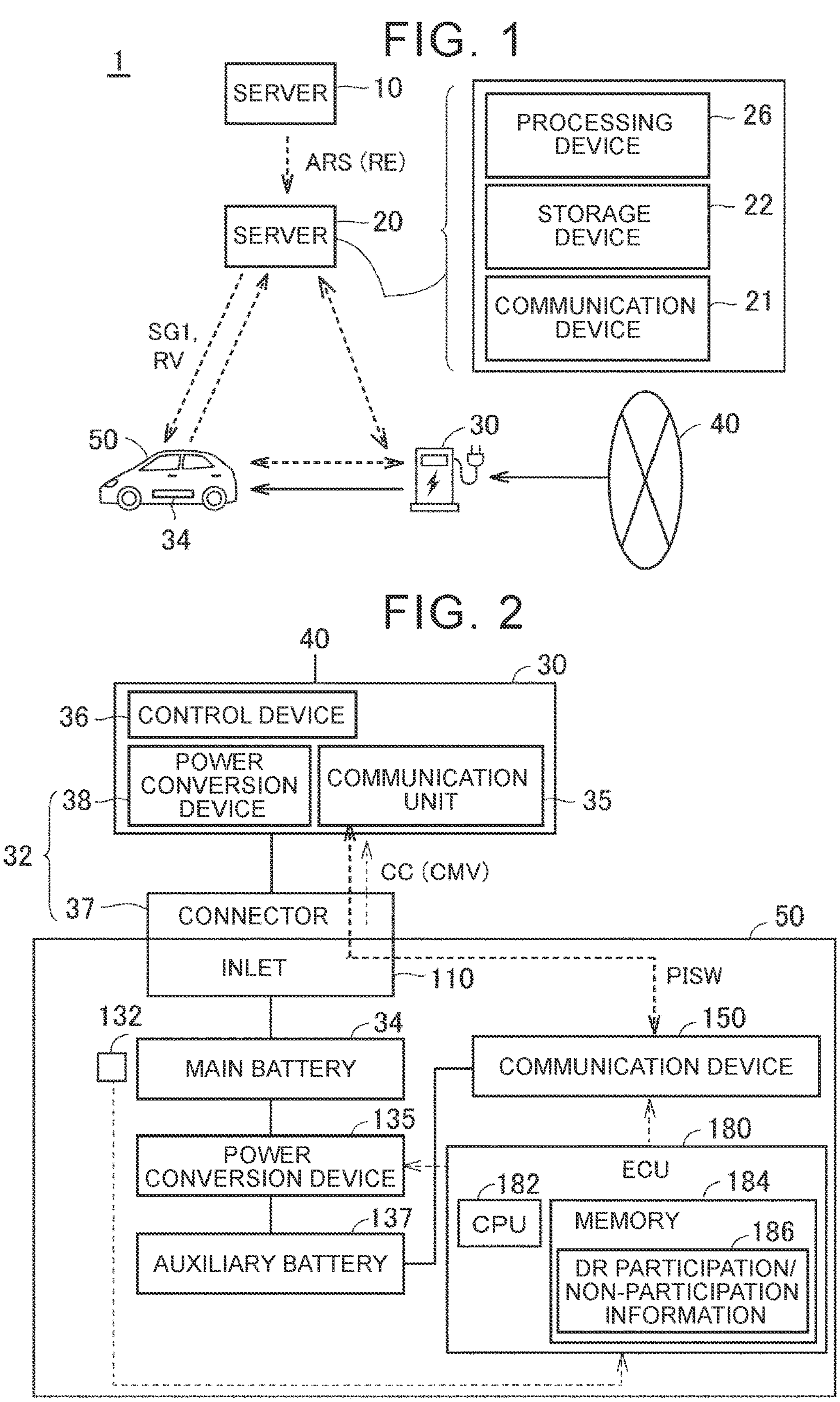
FIG. 1 is a diagram showing the configuration of a power adjustment system according to a first embodiment.
FIG. 2 is a diagram showing detailed configurations of power equipment and a vehicle.

Hereinafter, embodiments of the present disclosure will be described in detail with reference to the drawings. In the drawings, the same or corresponding parts are denoted by the same reference signs and the description thereof will not be repeated.

First Embodiment

FIG. 1 is a diagram showing the configuration of a power adjustment system according to a first embodiment. As shown in FIG. 1, a power adjustment system 1 includes servers 10 and 20, a power grid 40, power equipment 30, and a vehicle 50.

The server 10 is operated by an electric power company. The server 10 transmits an adjustment request signal ARS for requesting adjustment of a power supply and demand balance in the power grid 40 to the server 20 (described later). The adjustment request signal ARS includes information indicating a power adjustment period and adjustment request electric energy RE. The power adjustment period is a period of the requested adjustment of the power supply and demand balance. The adjustment request electric energy is requested electric energy to be adjusted (for example, increased) in the power adjustment period.

The server 20 includes a communication device 21, a storage device 22, and a processing device 26. The communication device 21 communicates with devices outside the server 20, such as the server 10, the power equipment 30, and the vehicle 50. The storage device 22 includes a random access memory (RAM) and a read only memory (ROM) (neither shown). The ROM stores programs to be used by the processing device 26.

The server 20 is operated by an aggregator. The server 20 receives the adjustment request signal ARS because it has won the right to perform the supply and demand balance adjustment in the electricity trading market. The server 20 calculates, for each power adjustment resource such as the vehicle 50, electric energy to be allocated to the resource based on the adjustment request electric energy RE, and requests each resource to participate in DR. The server 20 inquires of a user of the vehicle 50 whether the vehicle 50 will participate in the DR by transmitting a signal SG1 for requesting DR participation to the vehicle 50. As a result, DR participation or non-participation by the vehicle 50 is determined.

The power equipment 30 is connected to the power grid 40. The power equipment 30 supplies electric power to the vehicle 50 when electrically connected to the vehicle 50.

The vehicle 50 is an electrified vehicle including a main battery 34. The vehicle 50 can participate in the DR by receiving electric power supplied from the power equipment 30 (in this example, performing external charging). The external charging is charging of the main battery 34 with electric power supplied from the power equipment 30. The power storage amount of the main battery 34 is represented by SOC. When the vehicle 50 participates in the DR, the vehicle 50 receives (acquires) a requested value RV of supplied electric power from the server 20. In this case, the vehicle 50 performs the external charging based on the requested value RV during the power adjustment period. The requested value RV is determined by the server 20 from the viewpoint of adjusting the power supply and demand balance. The vehicle 50 can also discharge electric power to the power grid 40 through the power equipment 30.

FIG. 2 is a diagram showing detailed configurations of the power equipment 30 and the vehicle 50. As shown in FIG. 2, the power equipment 30 includes a power supply device 32, a communication unit 35, and a control device 36.

The power supply device 32 includes a connector 37 and a power conversion device 38. The power conversion device 38 converts electric power supplied from the power grid 40 and supplies the converted electric power to the vehicle 50 through the connector 37. The power supply device 32 supplies the electric power to an inlet 110 when the connector 37 is connected to the inlet 110.

The communication unit 35 communicates with the vehicle 50, for example, by controller area network (CAN) communication. The communication unit 35 acquires the SOC of the main battery 34 (hereinafter also simply referred to as "SOC") from the vehicle 50.

The control device 36 executes a power supply control process by controlling the communication unit 35 and the power conversion device 38. This process is to control power supply from the power equipment 30 to the vehicle 50 (inlet 110). This process includes controlling the power conversion device 38 so that electric power corresponding to a command value CMV (described later) is supplied from the power equipment 30 to the inlet 110.

The vehicle 50 includes the inlet 110, the main battery 34, a sensor unit 132, a power conversion device 135, an auxiliary battery 137, a communication device 150, and an ECU 180.

The inlet 110 is connected to the connector 37. The inlet 110 receives electric power supplied from the power equipment 30 when connected to the power equipment 30.

The main battery 34 stores electric power for traveling of the vehicle 50. The main battery 34 is charged with electric power received by the inlet 110. A power conversion device may be provided between the main battery 34 and the inlet 110. The sensor unit 132 detects a voltage, a current, and a temperature of the main battery 34.

The power conversion device 135 can perform pump-up charging in which electric power from the main battery 34 is converted and the auxiliary battery 137 is charged with the converted electric power. The auxiliary battery 137 is chargeable with the electric power of the main battery 34 by the pump-up charging.

The communication device 150 communicates with the power equipment 30 by CAN communication by consuming electric power of the auxiliary battery 137. The communication device 150 transmits and receives a connection signal PISW that is switched in response to connection or disconnection between the inlet 110 and the connector 37 to and from the power equipment 30. The communication device 150 executes a predetermined communication sequence (described later) before the external charging.

The ECU 180 includes a central processing unit (CPU) 182 and a memory 184. The memory 184 includes a ROM and a RAM (neither shown). The ROM stores data and programs to be executed by the CPU 182. The data includes DR participation/non-participation information 186. The DR participation/non-participation information 186 is set based on the result of the above inquiry, and includes information indicating whether the vehicle 50 will participate in the DR, and information indicating the date and time of participation (power adjustment period) and the requested value RV when the vehicle 50 will participate in the DR.

The ECU 180 calculates the SOC based on a detection value from the sensor unit 132. The ECU 180 executes an external charging control process for controlling the external charging by controlling the power conversion device 135 and the communication device 150. This process includes generating a control command CC for controlling the power equipment 30 and transmitting the control command CC to the power equipment 30 through the communication device 150. The control command CC includes the command value CMV for electric power to be supplied from the power equipment 30 to the inlet 110.

Figure 3:
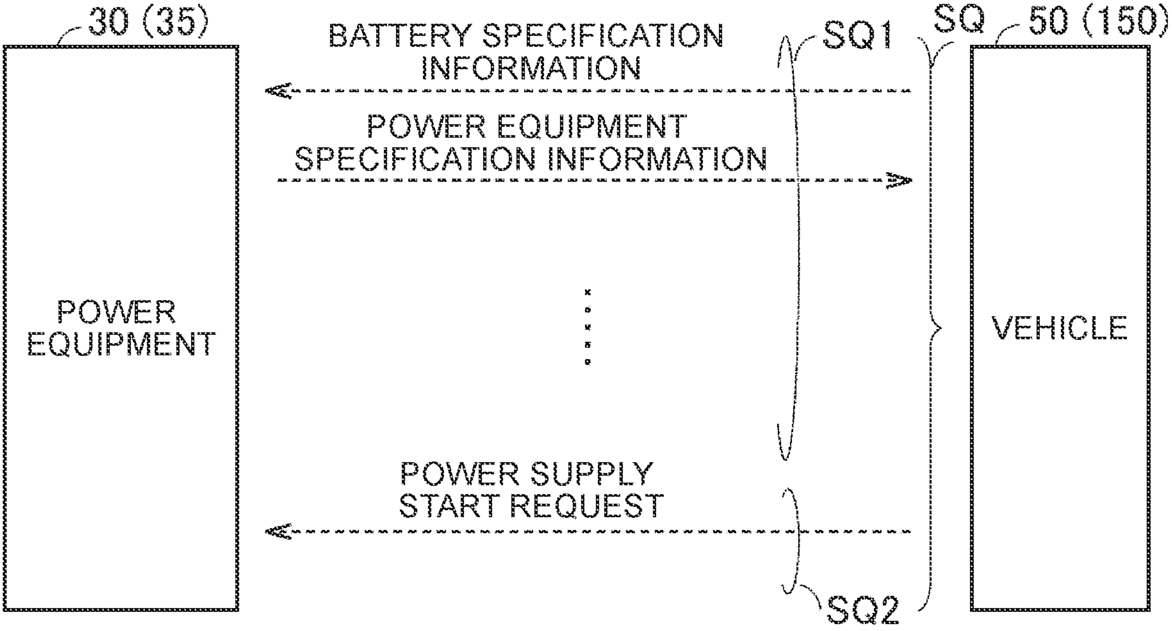
FIG. 3 is a diagram illustrating a communication sequence to be executed by a communication device with the power equipment.

FIG. 3 is a diagram illustrating a communication sequence to be executed by the communication device 150 with the power equipment 30. This communication sequence is basically executed before the external charging.

Referring to FIG. 3, a communication sequence SQ includes sequences SQ1 and SQ2. The sequence SQ1 is a process of exchanging various types of information (advance information) that are preferably transmitted in advance between the vehicle 50 and the power equipment 30 prior to the start of the external charging. The advance information includes specification information of the main battery 34 (maximum value of charged electric power, etc.) and specification information of the power equipment 30 (maximum value of supplied electric power, etc.). The advance information is used to protect the main battery 34, the inlet 110, and the power equipment 30 from overheating (that is, to prevent an excessive amount of power transfer between them) during the external charging.

The sequence SQ2 is a process of exchanging minimally required information to be transmitted between the vehicle 50 and the power equipment 30 to start the external charging (minimally required transmission information). This information includes a request to start power supply from the vehicle 50 to the power equipment 30. The sequence SQ2 may further include a process of transmitting the minimum value of the charged electric power of the main battery 34 to the power equipment 30. The sequence SQ2 is basically executed after the sequence SQL When the electric power of the auxiliary battery 137 decreases but the SOC is high, the auxiliary battery 137 can be charged by the pump-up charging. When the SOC is low, the pump-up charging may be difficult. Therefore, when the electric power of the auxiliary battery 137 is exhausted, the communication device 150 cannot operate. Therefore, the communication between the vehicle 50 and the power equipment 30 is interrupted, for example, during execution of the communication sequence SQ by the communication device 150, and the communication sequence SQ cannot be completed. As a result, a problem arises in that the vehicle 50 and the power equipment 30 cannot sufficiently exchange the advance information, and furthermore, cannot exchange the minimally required transmission information.

When the vehicle 50 receives electric power supplied from the power equipment 30 without participating in the DR, a problem arises in that the power supply from the power equipment 30 to the vehicle 50 (power reception by the vehicle 50) may influence the power supply and demand balance depending on the magnitude of the supplied electric power.

The vehicle 50 according to the first embodiment has a configuration for dealing with the above problems. Specifically, when the vehicle 50 does not participate in the DR and a connection-timing SOC of the main battery 34 is lower than a threshold value (described later), the ECU 180 executes a minute charging process. The connection-timing SOC is an SOC when the inlet 110 is connected to the power equipment 30, and corresponds to an SOC when the signal level of the connection signal PISW is switched.

The minute charging process is to charge the main battery 34 with minute electric power that is smaller than the electric power supplied when the vehicle 50 participates in the DR (DR-supplied electric power). Specifically, this process corresponds to generating the control command CC to set the command value CMV (FIG. 2) to a minute value MV, and transmitting it to the power equipment 30 through the communication device 150. The minute value MV is prestored in the memory 184 of the ECU 180 as a value smaller than the minimum value of the DR-supplied electric power, and is, for example, the minimum value of the charged electric power of the main battery 34. The minimum value of the DR-supplied electric power is predetermined by the rules of the electricity trading market.

When the minute charging process is executed as described above, the main battery 34 is charged with the minute electric power supplied from the power equipment 30 through the inlet 110. Therefore, it is possible to substantially prevent the influence on the power supply and demand balance due to the power supply from the power equipment 30 to the vehicle 50 (power reception by the vehicle 50). After the charging of the main battery 34 with the minute electric power continues and the SOC increases, the auxiliary battery 137 can securely be charged by the pump-up charging. As a result, it is possible to securely prevent the exhaustion of the electric power of the auxiliary battery 137. Therefore, the communication device 150 can securely communicate with the power equipment 30 by using the electric power of the auxiliary battery 137. Then, the communication device 150 can sufficiently exchange the advance information with the power equipment 30 before the external charging.

The external charging control process described above includes the minute charging process and a normal charging process. The minute charging process does not require the completion of the entire communication sequence SQ before its execution, but requires only the completion of the sequence SQ2. That is, when executing the minute charging process, the ECU 180 forces the communication device 150 to skip the sequence SQ1 and execute only the sequence SQ2, and then executes (starts) the minute charging process.

Therefore, the charging of the main battery 34 can be started without causing the communication device 150 to consume the amount of electric power required for the execution of the sequence SQ1 in the auxiliary battery 137. Since the charged electric power of the main battery 34 is the minute electric power, the main battery 34, the inlet 110, and the power equipment 30 are protected from overheating. In the first embodiment, it is assumed that the electric power of the auxiliary battery 137 is not exhausted when only the sequence SQ2 is executed.

The normal charging process is to charge the main battery 34 with normal supplied electric power that is larger than the minute electric power. The normal supplied electric power corresponds to the requested value RV when the vehicle 50 participates in the DR, and is determined based on the specifications of the vehicle 50 and the power equipment 30 when the vehicle 50 does not participate in the DR.

The normal charging process is executed when the communication sequence SQ is completed after the minute charging process. In other words, the communication device 150 starts and completes the communication sequence SQ to cause the ECU 180 to start the normal charging process after the minute charging process.

The above threshold value is an SOC at which the auxiliary battery 137 can be charged from the main battery 34 by the pump-up charging for the power consumption required for operating the communication device 150. This power consumption is required for the communication device 150 to complete the communication sequence SQ.

With the threshold value set in this way, the minute charging process is executed when the SOC has so decreased that the auxiliary battery 137 cannot be charged by the pump-up charging to cause the communication device 150 to complete the communication sequence SQ. Therefore, the main battery 34 is charged with the minute electric power, and then the auxiliary battery 137 can be charged by the pump-up charging. As a result, the auxiliary battery 137 can securely be charged with electric power that enables the communication device 150 to complete the communication sequence SQ. Thus, the normal charging process can be started after sufficient advance information is securely exchanged between the vehicle 50 and the power equipment 30. Accordingly, the normal charging process can be executed to protect the main battery 34, the inlet 110, the power equipment 30, and the like from overheating.

Figure 4:
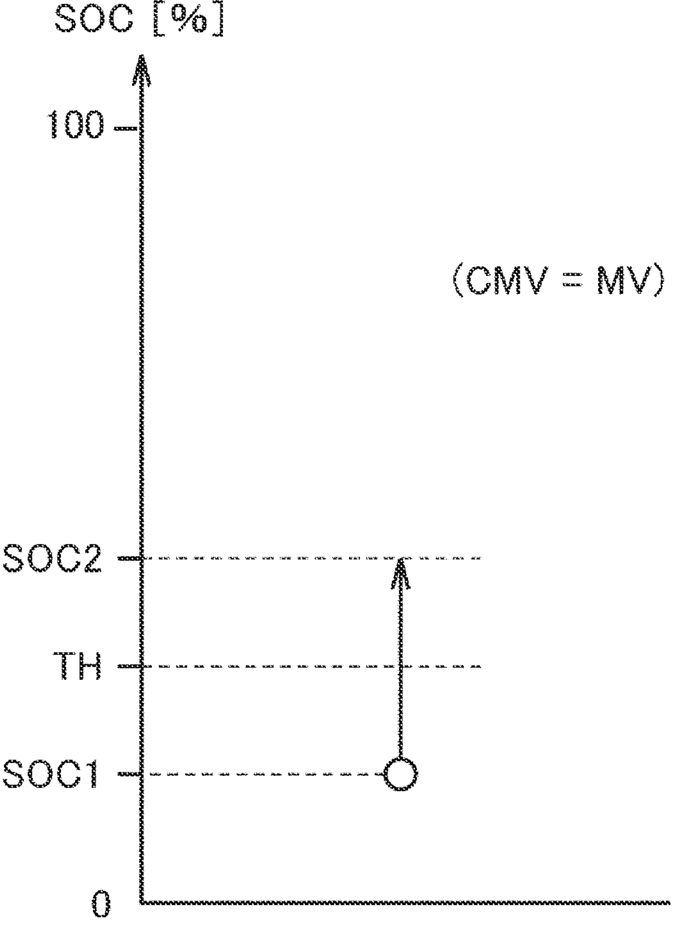
FIG. 4 is a diagram illustrating a change in SOC during a minute charging process.

FIG. 4 is a diagram illustrating a change in the SOC during the minute charging process. In this example, the vehicle 50 does not participate in the DR. As shown in FIG. 4, SOC1 is a predetermined value lower than a threshold value TH, and SOC2 is a predetermined value equal to or higher than the threshold value TH. The threshold value TH is, for example, 20% of the full charge SOC.

When the connection-timing SOC of the main battery 34 is SOC1, the ECU 180 executes the minute charging process until the SOC increases from SOC1 to SOC2. When the SOC reaches SOC2, the ECU 180 terminates the minute charging process, causes the communication device 150 to execute the entire communication sequence SQ, and then executes (starts) the normal charging process.

Figure 5:
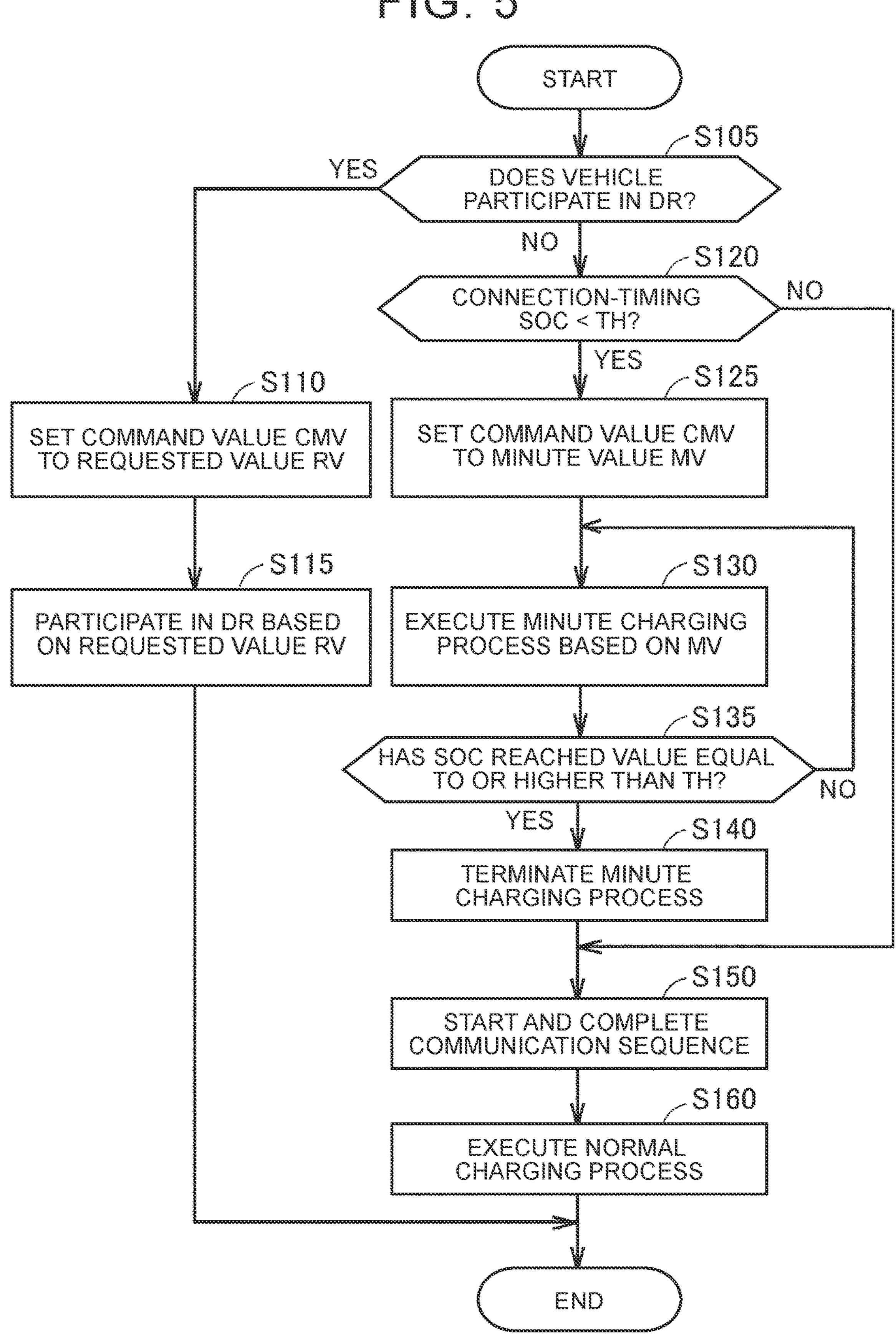
FIG. 5 is a flowchart showing an example of a process to be executed by an electronic control unit (ECU) of the vehicle.

FIG. 5 is a flowchart showing an example of a process to be executed by the ECU 180 according to the first embodiment. This flowchart is started when the inlet 110 is connected to the connector 37. Hereinafter, the step is abbreviated as "S".

Referring to FIG. 5, the ECU 180 uses the DR participation/non-participation information 186 (FIG. 2) to switch the process depending on whether the vehicle 50 participates in the DR (S105). When the vehicle 50 participates in the DR (YES in S105), the ECU 180 sets the command value CMV to the requested value RV from the server 20 (S110). Then, the ECU 180 participates in the DR by the external charging based on the requested value RV (S115) and terminates the process. When the vehicle 50 does not participate in the DR (NO in S105), the process proceeds to S120.

The ECU 180 determines whether the connection-timing SOC of the main battery 34 is lower than the threshold value TH (S120). When the connection-timing SOC is equal to or higher than the threshold value TH (NO in S120), the process proceeds to S150. When the connection-timing SOC is lower than the threshold value TH (for example, SOC1 in FIG. 4) (YES in S120), the ECU 180 sets the command value CMV to the minute value MV (S125), causes the communication device 150 to execute only the sequence SQ2, and then executes the minute charging process based on the minute value MV (S130).

The ECU 180 determines whether the SOC has reached a value equal to or higher than the threshold value TH (in this example, SOC2 in FIG. 4) (S135). When the SOC has not yet reached SOC2 (NO in S135), the process returns to S130. When the SOC has reached SOC2 (YES in S135), the ECU 180 terminates the minute charging process (S140), controls the communication device 150 to start and complete the communication sequence SQ (S150), and then executes (starts) the normal charging process (S160).

Modification of First Embodiment

The supplied electric power may be controlled by the control device 36 of the power equipment 30 instead of the ECU 180. In this modification, when the vehicle 50 does not participate in the DR and the connection-timing SOC is lower than the threshold value TH, the control device 36 executes a minute power supply process. The minute power supply process is to control the supplied electric power to charge the main battery 34 with the minute electric power (supply the minute electric power from the power equipment 30 to the inlet 110).

The power supply control process by the control device 36 includes the minute power supply process and a normal power supply process. The normal power supply process is to supply normal supplied electric power to the inlet 110 by using the power conversion device 38. The minute power supply process and the normal power supply process are executed instead of the minute charging process and the normal charging process in the first embodiment, respectively.

The communication device 150 completes the communication sequence SQ to cause the ECU 180 to start the normal power supply process after the minute power supply process. The communication unit 35 can check the progress of the communication sequence SQ (including completion or non-completion of the communication sequence SQ).

FIG. 6 is a flowchart showing an example of a process to be executed by the control device 36 in this modification. This flowchart is started when the connector 37 is connected to the inlet 110. Referring to FIGS. 6, S205 and S220 are the same as S105 and S120 (FIG. 5), respectively, except that they are executed by the control device 36 instead of the ECU 180.

The control device 36 acquires the connection-timing SOC of the main battery 34 and the DR participation/non-participation information 186 (FIG. 2) from the vehicle 50 through the communication unit 35 (S202).

The control device 36 determines whether the vehicle 50 participates in the DR based on the acquired DR participation/non-participation information 186 (S205). When the vehicle 50 participates in the DR (YES in S205), the control device 36 acquires the requested value RV from the vehicle 50 and sets a control value CV for the supplied electric power to the requested value RV (S210). The control device 36 supplies electric power to the vehicle 50 based on the requested value RV (S215), and then terminates the process. When the vehicle 50 does not participate in the DR (NO in S205), the process proceeds to S220.

When the connection-timing SOC is equal to or higher than the threshold value TH (NO in S220), the process proceeds to S250. When the connection-timing SOC is lower than the threshold value TH (YES in S220), the control device 36 acquires the minute value MV from the vehicle 50 and sets the control value CV to the minute value MV (S225). After only the sequence SQ2 is executed out of the sequences SQ1 and SQ2, the control device 36 executes the minute power supply process based on the minute value MV (S230).

The control device 36 determines whether the SOC has reached a value equal to or higher than the threshold value TH (in this example, SOC2) (S235). When the SOC has not yet reached SOC2 (NO in S235), the process returns to S230. When the SOC has reached SOC2 (YES in S235), the control device 36 terminates the minute power supply process (S240), checks the start and completion of the communication sequence SQ (S250), and executes the normal power supply process (S260). Then, the process of FIG. 6 is terminated.

Second Embodiment

In the second embodiment, a power receiving vehicle capable of receiving electric power from the power grid 40 through the power equipment 30 or a discharging vehicle capable of discharging electric power to the power grid 40 through the power equipment 30 is present as a vehicle different from the vehicle 50.

Figure 7:
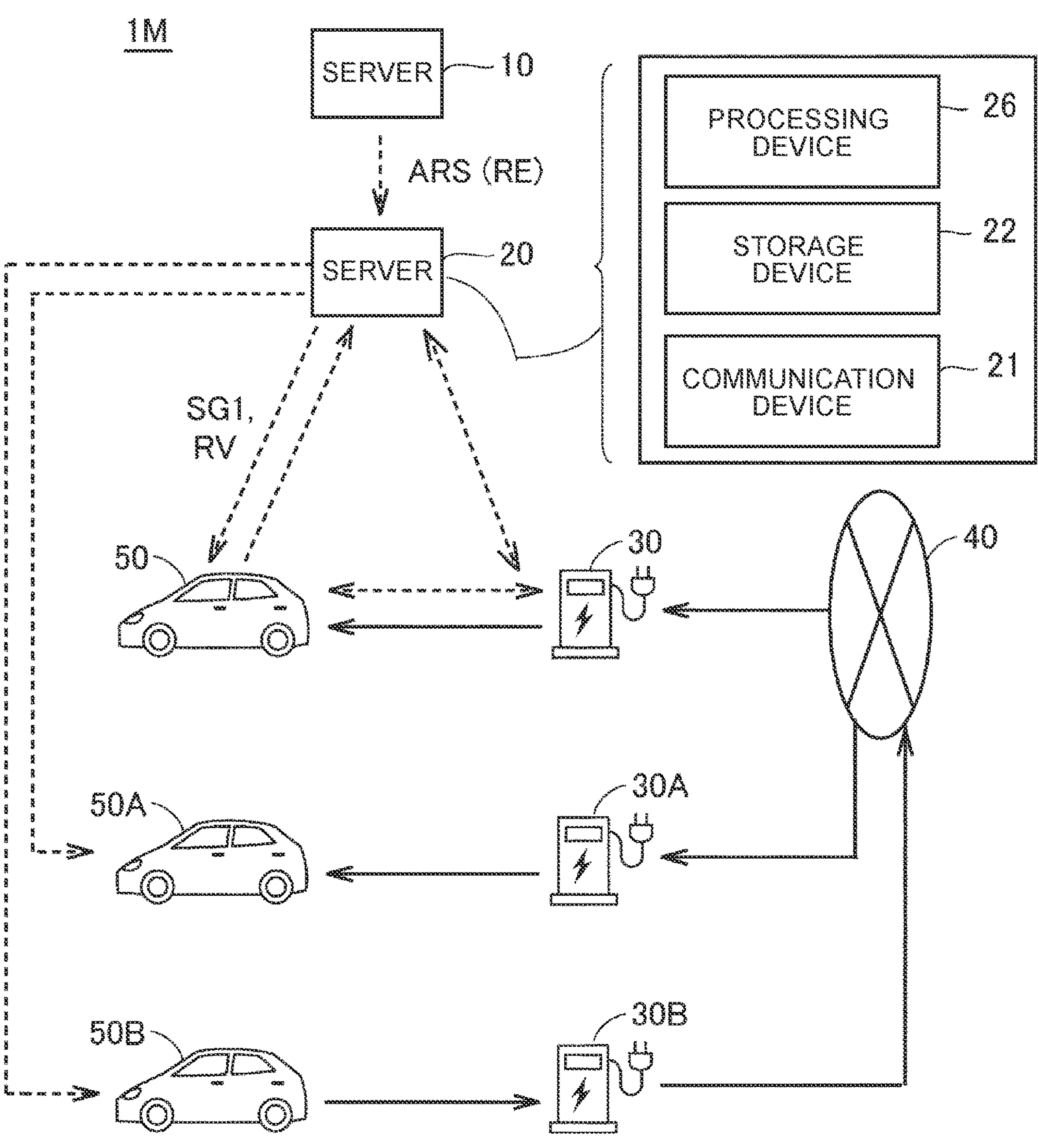
FIG. 7 is a diagram showing the configuration of a power adjustment system according to a second embodiment.

FIG. 7 is a diagram showing the configuration of a power adjustment system according to the second embodiment. As shown in FIG. 7, a power adjustment system 1M differs from the power adjustment system 1 (FIG. 1) in that it further includes vehicles 50A and 50B and pieces of power equipment 30A and 30B.

The configurations of the vehicles 50A and 50B are basically the same as that of the vehicle 50 (FIG. 2). The vehicles 50A and 50B correspond to the power receiving vehicle and the discharging vehicle, respectively. The vehicles 50A and 50B are connected to the pieces of power equipment 30A and 30B, respectively. The pieces of power equipment 30A and 30B are connected to the power grid 40.

The server 20 communicates with the vehicles 50, 50A, and 50B. For example, when the vehicle 50 starts to receive electric power from the power equipment 30, the server 20 acquires, from the vehicle 50, information indicating a value of received electric power of the vehicle 50 (received electric power information). The server 20 determines whether the vehicle 50 starts to receive electric power based on the received electric power information. The value of the received electric power is, for example, the minute value MV.

It is assumed that the received electric power of each of the vehicles 50 and 50A and the discharged electric power of the vehicle 50B are equal to the charged electric power and the discharged electric power of the corresponding main batteries 34, respectively.

Figure 8:
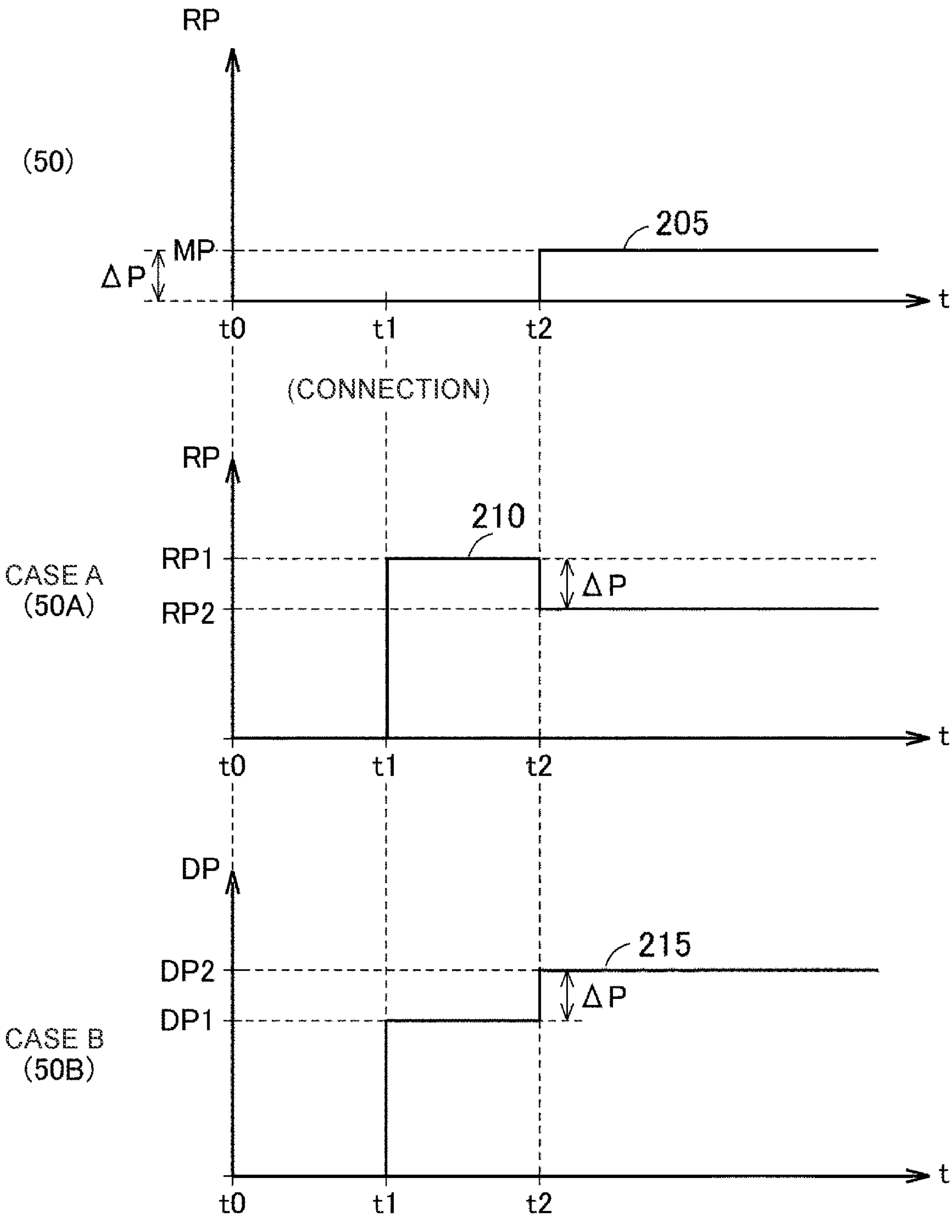
FIG. 8 is a diagram showing transitions in received electric power and discharged electric power of vehicles.

FIG. 8 is a diagram showing transitions in the received electric power of each of the vehicles 50 and 50A and the discharged electric power of the vehicle 50B. In this example, it is assumed that the vehicle 50 does not participate in the DR and the connection-timing SOC of the main battery 34 of the vehicle 50 is lower than the threshold value TH.

Referring to FIG. 8, a line 205 indicates a transition of received electric power RP of the vehicle 50. At a time t2 later than a time t1, the inlet 110 of the vehicle 50 is connected to the power equipment 30, and the minute charging process (or the minute power supply process) is executed on the vehicle 50. As a result, the received electric power RP of the vehicle 50 changes from 0 to MP (increases by ΔP). The vehicle 50 transmits received electric power information to the server 20 in response to the start of the power reception.

A line 210 indicates a transition of received electric power RP of the vehicle 50A in a case A. In the case A, the vehicle 50A receives electric power from the power grid 40, and the vehicle 50B does not discharge electric power to the power grid 40. The vehicle 50A starts to receive electric power at the time t1, and the received electric power RP at that time is RP1. At the time t2, in response to reception of the received electric power information, the server 20 requests the vehicle 50A to reduce (to RP2) the received electric power RP of the vehicle 50A (in this example, by ΔP). Therefore, the vehicle 50A reduces the command value CMV for the electric power to be supplied from the power equipment 30A to the vehicle 50A. As a result, the received electric power of the vehicle 50A is reduced by ΔP.

Thus, in the case A, the received electric power of the vehicle 50A is reduced by ΔP when the main battery 34 of the vehicle 50 is charged with the minute electric power (after the time t2) in the case where the vehicle 50A receives the received electric power RP from the power grid 40 through the power equipment 30. As a result, the increase in power load on the power grid 40 due to the start of power reception by the vehicle 50 and the reduction in power load due to the reduction in the received electric power of the vehicle 50A cancel each other.

A line 215 indicates a transition of discharged electric power DP of the vehicle 50B in a case B. In the case B, the vehicle 50A does not receive electric power from the power grid 40, and the vehicle 50B discharges electric power to the power grid 40. The vehicle 50B starts to discharge electric power at the time t1, and the discharged electric power DP at that time is DP1. At the time t2, in response to reception of the received electric power information, the server 20 requests the vehicle 50B to increase (to DP2) the discharged electric power DP of the vehicle 50B (in this example, by ΔP). As a result, the discharged electric power DP is increased by ΔP.

Thus, in the case B, the discharged electric power DP of the vehicle 50B is increased by ΔP when the main battery 34 of the vehicle 50 is charged with the minute electric power (after the time t2) in the case where the vehicle 50B discharges the discharged electric power DP to the power grid 40 through the power equipment 30. As a result, the increase in power load due to the start of power reception by the vehicle 50 and the increase in power supply on the power grid 40 due to the increase in the discharged electric power of the vehicle 50B cancel each other.

According to the second embodiment, it is possible to reduce (for example, eliminate) the influence on the power supply and demand balance due to the start of the minute charging process (minute power supply process) of the vehicle 50. As a result, it is possible to prevent the exhaustion of the electric power of the auxiliary battery 137 of the vehicle 50 while contributing more effectively to the adjustment of the power supply and demand balance.

The embodiments disclosed herein should be considered to be illustrative and not restrictive in all respects. The scope of the present disclosure is shown by the claims rather than by the above description, and is intended to include all modifications within the meaning and the scope equivalent to the claims.

What is claimed is:

1. A vehicle configured to participate in energy adjustment for adjusting a power supply and demand balance in a power grid, the vehicle comprising:

a power receiving device configured to receive electric power supplied from power equipment connected to the power grid when connected to the power equipment;

a first power storage device configured to be charged with the electric power received by the power receiving device;

a second power storage device connected to the first power storage device and configured to be charged with electric power of the first power storage device; and a communication device configured to communicate with the power equipment by using electric power of the second power storage device, wherein a communication sequence between the communication device and the power equipment includes a first sequence for exchanging advance information prior to start of charging and a second sequence for exchanging minimally required transmission information for starting charging, wherein, when the vehicle does not participate in the energy adjustment and a state of charge of the first power storage device is lower than a threshold value when the power receiving device is connected to the power equipment, the communication device is configured to complete only the second sequence without completing the first sequence, and then the first power storage device is charged with minute electric power smaller than supplied electric power in a case where the vehicle participates in the energy adjustment, and after the state of charge of the first power storage device reaches the threshold value, the communication device is configured to complete the communication sequence including at least the first sequence, and then the first power storage device is charged with electric power larger than the minute electric power.

2. The vehicle according to claim 1, wherein the threshold value is the state of charge at which the second power storage device is charged from the first power storage device for a power consumption required for operating the communication device.

3. The vehicle according to claim 2, further comprising a control device configured to execute a charging control process for controlling charging of the first power storage device, wherein the charging control process includes:

a first charging process for charging the first power storage device with the minute electric power; and a second charging process for charging the first power storage device after the first charging process with supplied electric power larger than the minute electric power, the communication device is configured to complete the communication sequence including at least the first sequence to start the second charging process after the first charging process, and the power consumption required for operating the communication device is a power consumption required for completing the communication sequence by the communication device.

4. The vehicle according to claim 1, wherein the advance information includes specification information of the first power storage device and specification information of the power equipment.

5. The vehicle according to claim 1, wherein the minimally required transmission information includes a request to start power supply from the power equipment to the vehicle.

6. The vehicle according to claim 1, wherein the advance information is used to protect the first power storage device, the power receiving device, and the power equipment from overheating during charging with the electric power larger than the minute electric power.

7. The vehicle according to claim 1, wherein the second power storage device is charged with the electric power of the first power storage device by a power conversion device configured to convert the electric power from the first power storage device.

8. The vehicle according to claim 1, wherein the minute electric power is a minimum value of charged electric power of the first power storage device.

9. A power adjustment system comprising:

a first vehicle serving as the vehicle according to claim 1; and a second vehicle different from the first vehicle and configured to receive electric power from the power grid, wherein in a case where the second vehicle receives the electric power from the power grid, the received electric power of the second vehicle when the first power storage device is charged with the minute electric power is smaller than the received electric power of the second vehicle when the first power storage device is not charged with the minute electric power.

10. A power adjustment system comprising:

a first vehicle serving as the vehicle according to claim 1; and a third vehicle different from the first vehicle and configured to discharge electric power to the power grid, wherein in a case where the third vehicle discharges the electric power to the power grid, the discharged electric power of the third vehicle when the first power storage device is charged with the minute electric power is larger than the discharged electric power of the third vehicle when the first power storage device is not charged with the minute electric power.

11. Power equipment configured to supply electric power to a vehicle, the vehicle being configured to be connected to a power grid and to participate in energy adjustment for adjusting a power supply and demand balance in the power grid, the vehicle including:

a power receiving device configured to receive electric power supplied from the power equipment when connected to the power equipment;

a first power storage device configured to be charged with the electric power received by the power receiving device;

a second power storage device connected to the first power storage device and configured to be charged with electric power of the first power storage device; and a communication device configured to communicate with the power equipment by using electric power of the second power storage device, wherein a communication sequence between the communication device and the power equipment includes a first sequence for exchanging advance information prior to start of charging and a second sequence for exchanging minimally required transmission information for starting charging, the power equipment comprising:

a power supply device configured to supply the electric power to the power receiving device when connected to the power receiving device; and a communication unit configured to acquire a state of charge of the first power storage device from the vehicle, wherein, when the vehicle does not participate in the energy adjustment and the state of charge of the first power storage device is lower than a threshold value when the power receiving device is connected to the power equipment, the communication device is configured to complete only the second sequence without completing the first sequence, and then the first power storage device is charged with minute electric power smaller than supplied electric power in a case where the vehicle participates in the energy adjustment, and after the state of charge of the first power storage device reaches the threshold value, the communication device is configured to complete the communication sequence including at least the first sequence, and then the first power storage device is charged with electric power larger than the minute electric power.

12. The power equipment according to claim 11, wherein the threshold value is the state of charge at which the second power storage device is charged from the first power storage device for a power consumption required for operating the communication device.

13. The power equipment according to claim 12, further comprising a power supply control device configured to execute a power supply control process for controlling power supply from the power supply device to the power receiving device, wherein the power supply control process includes:

a first power supply process for supplying the minute electric power to the power receiving device; and a second power supply process for supplying electric power larger than the minute electric power to the power receiving device after the first power supply process, the communication device is configured to complete the communication sequence including at least the first sequence to start the second power supply process after the first power supply process, and the power consumption required for operating the communication device is a power consumption required for completing the communication sequence by the communication device.

14. The power equipment according to claim 11, wherein the advance information includes specification information of the first power storage device and specification information of the power equipment.

15. The power equipment according to claim 11, wherein the minimally required transmission information includes a request to start power supply from the power equipment to the vehicle.

16. The power equipment according to claim 11, wherein the advance information is used to protect the first power storage device, the power receiving device, and the power equipment from overheating during charging with the electric power larger than the minute electric power.

17. The power equipment according to claim 11, wherein the second power storage device is charged with the electric power of the first power storage device by a power conversion device configured to convert the electric power from the first power storage device.

18. The power equipment according to claim 11, wherein the minute electric power is a minimum value of charged electric power of the first power storage device.

* * * * *